Oct. 31, 1939.  R. L. R. R. GEIRNAERT  2,178,037
MECHANISM FOR THE ADVANCEMENT OF THE CARRIAGE OF TYPEWRITERS AND THE LIKE
Filed Nov. 21, 1936  3 Sheets-Sheet 1
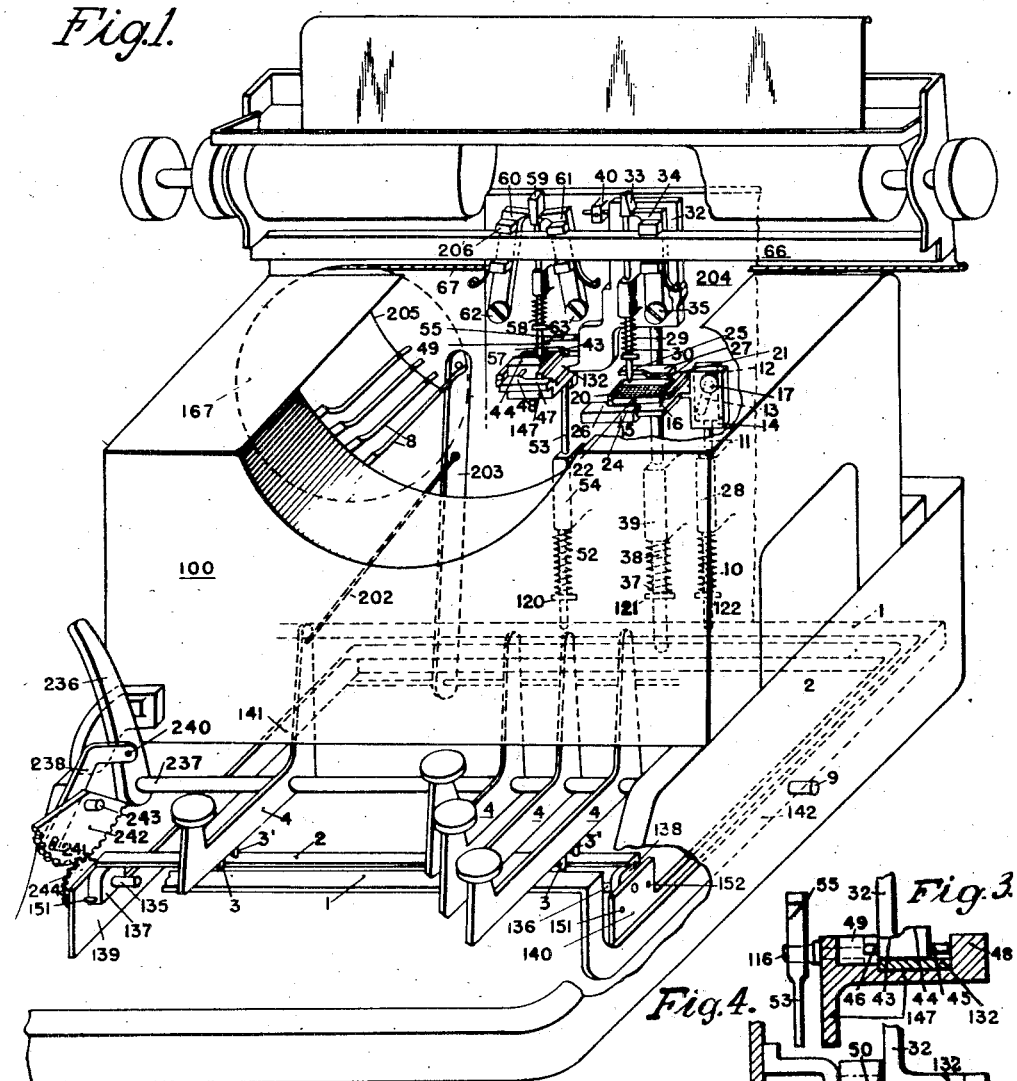
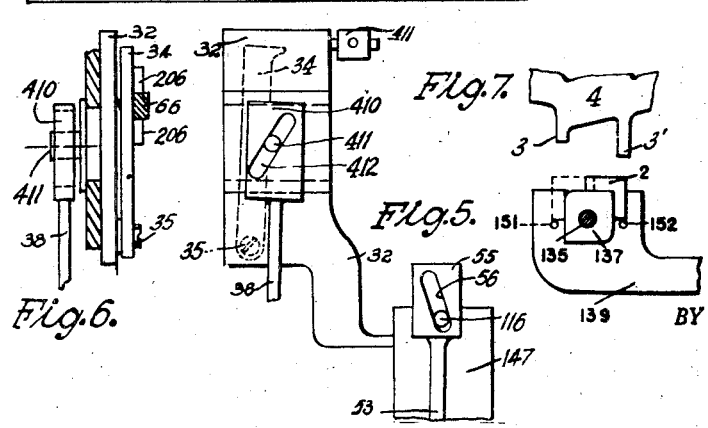
INVENTOR:
Rene, Louis, Romain, Robert
GEIRNAERT
BY
ATTORNEY.

Oct. 31, 1939.  R. L. R. R. GEIRNAERT  2,178,037
MECHANISM FOR THE ADVANCEMENT OF THE CARRIAGE OF TYPEWRITERS AND THE LIKE
Filed Nov. 21, 1936   3 Sheets-Sheet 2
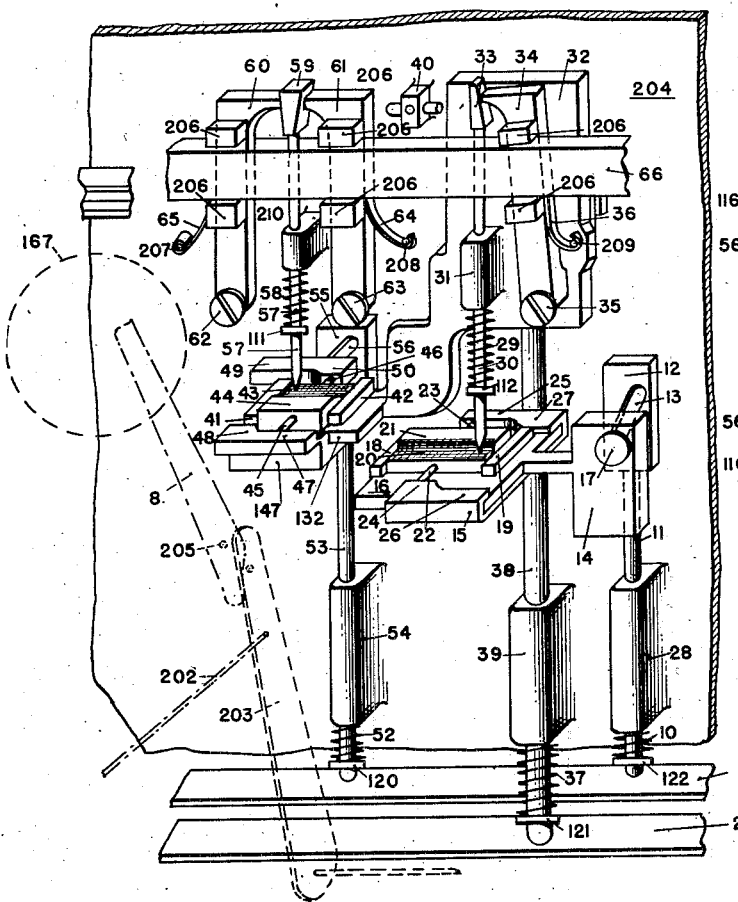
FIG. 2.
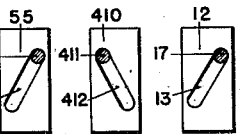
FIG. 11.
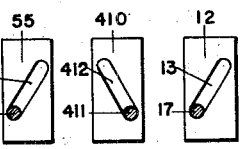
FIG. 12.
FIG. 14.
1.
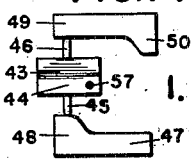
2.
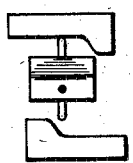
3.
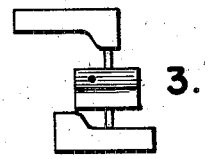
FIG. 13.
a.
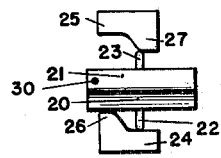
b.
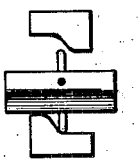
c.
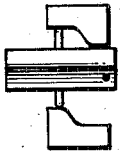
FIG. 14.
4.
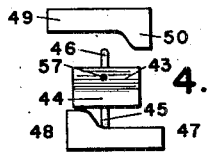
5.
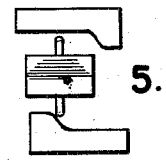
FIG. 13.
d.
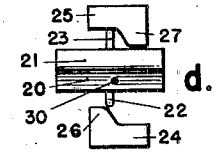
e.
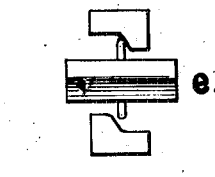
INVENTOR:
Rene, Louis, Romain, Robert
GEIRNAERT
BY
ATTORNEY Oct. 31, 1939.　　　R. L. R. R. GEIRNAERT　　　2,178,037
MECHANISM FOR THE ADVANCEMENT OF THE CARRIAGE OF TYPEWRITERS AND THE LIKE
Filed Nov. 21, 1936　　　3 Sheets-Sheet 3
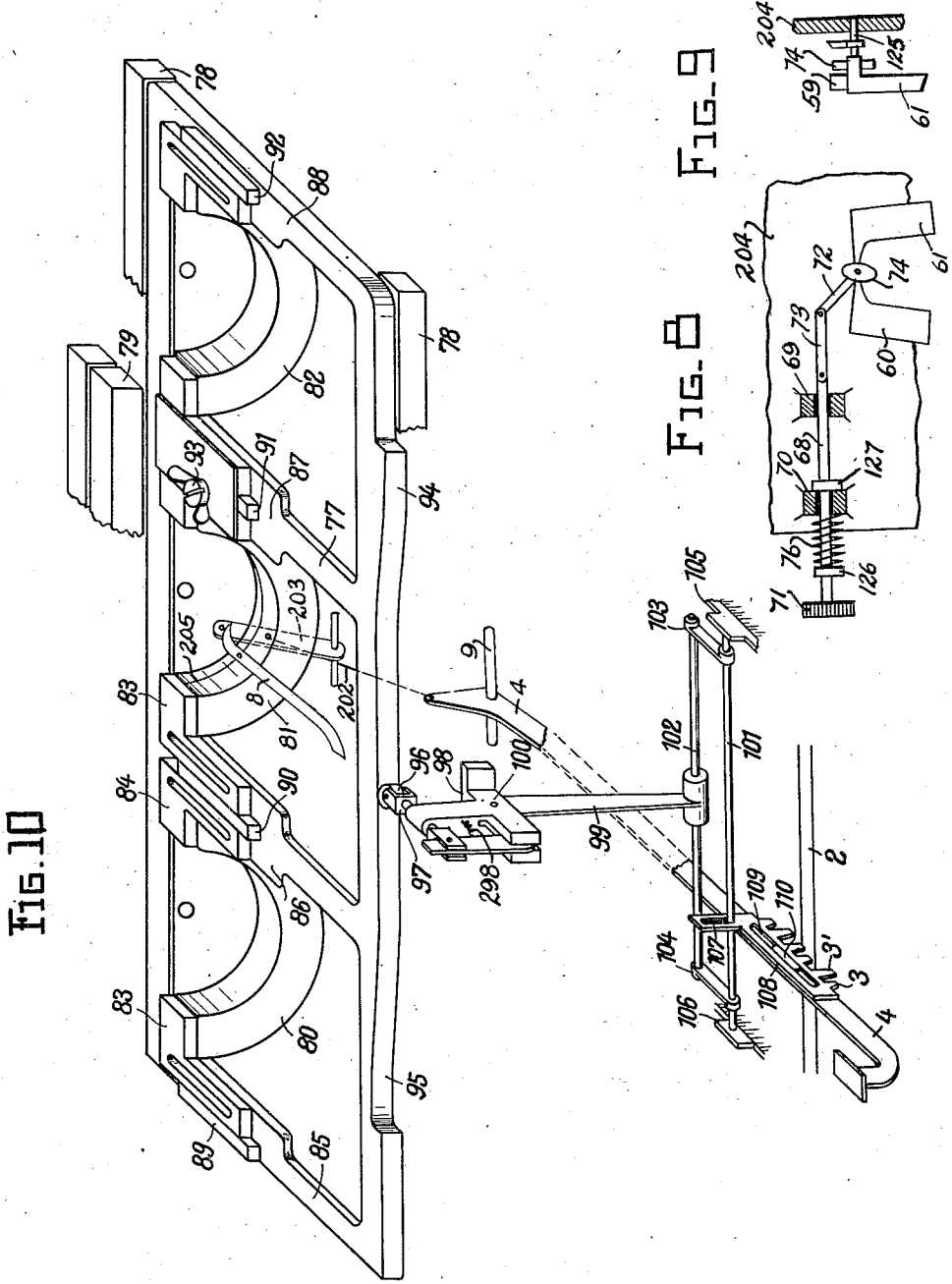
Inventor.
RENÉ, LOUIS, ROMAIN, ROBERT
GEIRNAERT
per
Attorney.

Patented Oct. 31, 1939

2,178,037

UNITED STATES PATENT OFFICE 2,178,037

MECHANISM FOR THE ADVANCEMENT OF THE CARRIAGE OF TYPEWRITERS AND THE LIKE

René Louis Romain Robert Geirnaert, Brussels, Belgium

Application November 21, 1936, Serial No. 112,020
In Germany December 3, 1935

16 Claims. (Cl. 197—22)

Application has been filed in Germany on December 3, 1935.

This application relates to a mechanism for displacing the carriage of typewriters for ordinary or special purposes that is to say, to a carriage escapement mechanism, and the invention is particularly applicable to a machine for printing with grease-ink on transfer paper, a print which is subsequently to be transferred on stone, zinc, copper, or the like.

It is a primary object of the invention to give to the typewriter carriage carrying the transfer paper a movement which is proportional to the width of the type engraved on the blocks carried by the type bars, and which type had been typed.

It is another object of the invention to provide several sets of type bars at the machine so as to be able to use several kinds of characters.

Thus the invention allows: in the art of lithography (1) to dispense (a) with typographic composition (that is to say the composition of a text in the form of a metallic negative); (b) with the operation of obtaining the grease print from a metallic negative; (2) to obtain the composition of all texts in the direct form of a proof printed with greasy transfer ink on transfer paper; (3) to enable in ordinary typewriting the use of type characters of different widths, the same as in printing.

A further object of the invention is a machine in which the composition for lithography is obtained, on the one hand, by the act of printing a grease-ink print by operating keys which are actuating type bars and, on the other hand, by a special mechanism which gives to the carriage carrying a sheet of transfer paper an escapement movement proportional to the width of each letter which has been printed.

According to the invention, the escapement mechanism for a spring or the like operated typewriter carriage includes a rail secured to the carriage and two gripping mechanisms for engaging the rail, one being stationary and secured to the frame of the machine, the other being likewise mounted at the frame of the machine, being however adapted, when gripping the rail, to clutch and move together with the carriage for a step. The escapement mechanism further includes control means, operated by the type keys, which alternatingly release and engage the two gripping mechanisms but engage the one before releasing the other and vice-versa. Between each releasing and re-engaging operation of the gripping mechanisms and in accordance with the various predetermined escapement widths each proportional to the different widths of the characters on the keys, the aforesaid control means displace the movable gripping mechanism in a direction opposite to the escapement movement.

The drawings annexed to this specification and forming part thereof represent by way of example one form of realization of the present invention.

Fig. 1 is a perspective front view of a typewriter according to this invention,

Fig. 2 is an elevational perspective view of the gripping and clutching mechanism of Fig. 1 illustrated on an enlarged scale, Fig. 3 is a side elevation, and Fig. 4 a plan of a control cam block for the stationary gripping device, Fig. 5 is a rear elevational view, and Fig. 6 a side elevation of the movable clutch mechanism and its control members, Fig. 7 is a side elevation of a control bar and co-operating key lugs for controlling the car displacement, Fig. 8 is a front view, and Fig. 9 a side view of a carriage releasing mechanism, Fig. 10 is a perspective front view of a carriage with three character bar segments, Fig. 11 is a diagrammatic front view showing the three control members in their rest position, Fig. 12 is a diagrammatic front view showing the same control members in their displaced position corresponding to the position of the elements shown in Fig. 2, Figs. 13 and 14 show top views of two control cam blocks respectively, in their various positions.

100 designates a typewriter according to this invention. The mechanism which controls the carriage escapement movement in accordance with, or proportional to the width of a character engraved on the block carried by the type bars (Fig. 1) consists of two bars 1 and 2 arranged parallel to each other and each forming part of a rectangular frame pivoted on a common axis 9. The type bars 8 carrying the types in relief are pivoted about shaft 205 connected to the keys 4 by a linkage system as usual in the art, only one such linkage consisting of link 202 and actuating lever 203 however being shown in the drawings (Fig. 1). These key bars 4 contact bar 1 directly by means of their lower surfaces and contact bar 2 either by means of lugs 3 or by means of lugs 3', the lengths of which lugs define the amount which the carriage will move after the operation of the mechanism, as will be described later on.

The two gripping means for controlling the escapement movement of the carriage are arranged on a base plate or rear wall 206 secured to the machine frame, the stationary gripping mechanism being bi-directional, i. e., acting self-locking for movement in both directions, and the movable gripping mechanism or clutch being uni-directional, i. e., self-locking for movement in one direction only.

Both gripping mechanisms include tiltable spring urged levers 60 and 61, and 34 respectively, which, by means of two buffers (206) each, embrace a rail 66 which is secured to the carriage. Levers 60, 61 of the stationary gripping mechanism are pivotally mounted at 62, 63 on the stationary rear wall 204, whereas lever 34 of the non-stationary or movable gripping mechanism is, by means of pivot 35, pivotally mounted on a displaceable clutch plate 32. Springs 65, 64 bearing against levers 60, 61 are secured at 207, 208 respectively, to the stationary base plate 204, and spring 36 bearing against lever 34 is secured by means of pin 209 to the displaceable clutch plate 32. The springs tend to tilt the levers into the locking position. It may easily be seen from Figure 2 that, when rail 66 is moved to the right, it will take the buffers along with it against the action of spring 36 and thus open the clamp, whereas if rail 66 would move to the left, the clamping effect will be increased and thus the rail locked. This gripping device is thus uni-directional; whereas, with any movement of rail 66, when gripping mechanism 60, 61 is in its gripping position, one or the other of the levers 60, 61 would lock the movement of rail 66, the device thus acting bi-directional.

Gripping or releasing position of levers 60 and 61, and 34, is governed by means of wedge-shaped members 59 and 33 respectively. These members are carried by pins 57 and 30 which are slidably mounted in guide pieces 210 and 31 respectively, guide piece 210 being secured to wall 204 and guide piece 31 to clutch plate 32.

Both pins are urged towards their lower position by means of springs 58 and 29 extended between guide pieces 210 and 31 at their one end and abutments 111 and 112 on pins 57 and 30 respectively, at their other end. In this lower position, wedge-member 59 will cause levers 60, 61 to release rail 66, whereas wedge-member 33 will allow lever 34 to clamp rail 66, as shown in Fig. 2.

Pin 57, by means of its spring 58, is urged against a cam block 43 having part of its upper surface raised as a boss 44. Cam block 43 may be displaced in two directions. It may be displaced longitudinally from the left to the right or vice versa, between two guide cams 47, 49, on which cams two pins 45 and 46 secured to block 43 at the centre of its front and rear faces may ride. Two raised portions 50 and 48 respectively, of both cams will, when they are contacted by pins 45 and 46 respectively, push cam block 43 fore and back within the rectilinear guides 41, 42 which are fast on a foot-like extension 132 of clutch plate 32. This foot-piece 132 is slidably arranged within the trough-like head of a bracket secured to, or of one piece, with the rear wall 204, Figs. 3 and 4. Two cam pieces 47 and 49 are oppositely arranged within the head of bracket 147, cam 47 being fast within said head whereas cam 49 is slidably arranged within the head and may be displaced with relation thereto by means of a pin secured to it and which pin may slide within an oblique slot 56 of a control member 55.

Pin 30, by means of its spring 29, is urged against a cam block 20 similarly arranged as cam block 43. One half of block 20 is raised and forms a boss 21. Lateral displacement of cam block 20 is guided between two rectilinear guides 18, 19, secured to a foot plate 16 protruding from a plate 14 which, by means of pin 17 sliding within an oblique slot 13 of a control member 12, may be reciprocated thus reciprocating foot plate 16. This lateral displacement of guide block 20 will be effected by the raised portions 26, 27 of two guide cams 24, 25, when these raised portions are met by two pins 22 and 23, secured to the centres of the front and rear faces of cam block 20, respectively. Cam pieces 24 and 25 are arranged on a guide body 15 secured to the rear wall 204, within which guide body, foot plate 16 may be displaced under control of control member 12. Clutch plate 32, by means of pin 411 and oblique slot 412 (Figs. 5 and 6), is connected to a control member 410, by means of which control member clutch plate 32 may be reciprocated longitudinally and will then slide pin 30 over cam block 20, and foot 132 within trough-like body 147.

There are thus three control members, two of them 55 and 12, bearing, by means of rods 53 and 11 respectively, on bar 1, the third, 410, by means of its rod 38 on bar 2.

The rods 53, 38 and 11 are guided in guide bodies 54, 39 and 28 respectively, and are urged towards bars 2 and 1, by means of springs 52, 37 and 10 extended between the guide bodies 54, 39 and 28 at their one ends and abutments 120, 121 and 122 of rods 53, 38, and 11, respectively, at their other ends.

The operation of the device is as follows:

When all parts of the machine are at rest, control members 12, 410 and 55 are in their lower positions. Plate 14 together with foot plate 16 is positioned to the right, boss 21 thus being at a position where its left rear part is underneath pin 30, Fig. 13a, pin 30 and wedge 33 being raised and gripping mechanism 34 open, Fig. 1. Plate 32 and foot plate 132 are in their left hand position, cam 49 within bracket 147 147 is positioned to the right and cam plate 43 is placed to the rear left hand side, Fig. 14—1. Pin 57 and wedge 59 are raised and levers 60, 61 are in their gripping positions.

When any character key 4 is depressed, it will operate by means of linkage 202, 203 the appertaining type bar 8 which, as usual, will be swung about axis 205. Simultaneously, key 4 will tilt directly front bar 1, and, by means of one of the lugs 3 or 3', will tilt front bar 2 about axis 9 and thus will raise rear bars 1 and 2.

Thus, printing of a type comprises the following operations: During the printing of a type, the position of the carriage must be secured; this will be attained by holding the grip of levers 60 and 61 closed. Simultaneously, the length of the escapement step is to be set and then the carriage to be released in order to operate this escapement step, and finally the escapement movement of the carriage is to be stopped and all control members and parts re-set.

In the original or rest position, Fig. 1, the control members 12, 410, and 55, are in their lower position, Fig. 11. When a type key 4 is operated, the rear bars of frames 1 and 2 are being lifted as will be described in detail later on. Raising bars 1 and 2 will raise control members 12, 55, and 410 simultaneously, Fig. 12. When control member 12 is being raised, member 14 will displace foot-plate 16, together with cam block 20, to the left. Cam block 20 however, for the first part of this movement to the left, remains in its front position, Fig. 13—b, until, towards the end of the block movement to the left, Fig. 13—c, pin 22 will ride on cam 26 and will thus displace cam block 20 to the rear. Pin 30 now leaves boss 21, wedge 33 is lowered and lever 34 grips the carriage 66.

Concomitantly with these operations, control member 410 is being raised to an extent which corresponds to the character spacing which is desired, as will be described later on in detail. Correspondingly, clutch plate 32 is displaced from abutment 40 to the right, a distance which equals the desired escapement step. Displacement of clutch plate 32 to the right, displaces pin 30 on boss 21, upon which it rides, to the right, Figs. 13—b and 13—c. As the path of pin 30 on cam plate 20 thus equals the sum of the strokes of cam plate 20 and of clutch plate 32, cam plate 20 must thus be made longer than would correspond to the length of its own movement. As soon as clutch plate 32 has been set in accordance to the required escapement step, pin 22, at the end of its movement, will have reached cam boss 26, Fig. 13—c. Lever 34 now closes its grip and thus clamps clutch plate 32 to bar 66, so that when levers 60 and 61 subsequently open their grip, the carriage may move an escapement step until clutch plate 32 abuts stop 40.

Grip levers 60 and 61 are controlled as follows: When, by means of control member 410, clutch plate 32 is set to the right, foot-plate 132 together with cam block 43 is displaced to the right, Fig. 14—2. As boss 44 is still in its rear position, pin 57 remains in its raised position and the grip of levers 60 and 61 is kept closed. Control member 55, by means of frame bar 1 had been lifted simultaneously with control members 12 and 410. Lifting of control member 55 displaces cam 49 to the left, Fig. 14—2. Towards the end of this displacement to the left, the raised part 50 of cam 49 will reach the rear pin 46 of cam block 43, Fig. 14—3 and will shift cam block 43 with its boss 44 to the front. Pin 57 together with its wedge 59 will now be lowered and the grip of levers on rail or bar 66 released, immediately after the closing of grip lever 34.

The escapement movement of clutch plate 32 now displaces foot-plate 132 together with cam block 43 to the left; pin 57 will ride upon the lower surface of block 43, Fig. 14—4 and will thus keep the grip of levers 60 and 61 open until, towards the end of the escapement movement, Fig. 14—5 the front pin 45 of cam block 43 will reach the raised part 48 of cam 47. Cam block 43 will now be shifted to the rear, and pin 57 will thus get on the raised part 44 of cam block 43 and close the grip of levers 60 and 61, Fig. 14—1. With the escapement movement of clutch plate 32, pin 30 has been moved to the left on the lower surface of cam block 20, Fig. 13—d and thus had kept the grip of lever 34 closed whilst levers 60 and 61 were in their open position.

At the end of the back-movement of control member 12, which is operated by spring 10 at the return of rail 1, pin 17 within slot 13 will have displaced foot-plate 6 together with cam plate 20 to the right, Fig. 13—e and due to this movement, rear pin 23 of cam block 20 will have reached the raised part 27 of cam block 20 and will thus have shifted boss 21 of cam block 20 underneath pin 30, Fig. 13—1. Prior to this movement, the grip of levers 60 and 61 had already been closed, as above stated, at the end of the escapement movement. Control member 410 had been re-set likewise by the escapement movement of clutch plate 32, when movement of the clutch plate extension 132 to the left by the intermediary of pin 411, had lowered control member 410. This downward movement of control member 410 had been assisted by spring 37 which concomitantly had re-set bar 2.

Back-movement of control member 55, actuated by spring 52, will finally re-set displaceable cam 49 to its rest position so that all control members and parts thus have now been re-set.

A type has thus been printed and the carriage has been displaced one step after the printing operation had been accomplished.

As clamps 61 and 34 co-operate and at any moment and alternatingly prevent rail 66 or the carriage from following the pull of spring 167 and cable 67 and from moving freely and uncontrolled to the left, a clamping mechanism for preventing rail 66 or the carriage from movement to the right will not be necessitated in every case and clamp 60 may be dispensed with in such cases. In cases, however, where operation of a machine might involve a tendency of the carriage to move or to escape to the right, clamp 60 will advantageously be used together with clamp 61, the gripping mechanism thus being bi-directional instead of uni-directional.

Figs. 8 and 9 show a mechanism which allows to open clamps 60, 61, and to release the carriage entirely. This mechanism comprises a rod 68, parallel to rail 66 of the carriage and slidably mounted within two brackets 69, 70 which are secured to the rear wall 204. Rod 68 carries at its one end a button 71 and at its other end, by means of link 73 and rocker lever 72, an oblong disc 74 fast to lever 72 and pivoted at 225 to the rear wall 204. This oblong disc is in its one dimension smaller than wedge piece 59 and is placed behind wedge 59, as shown in Fig. 9, and between the heads 60, 61 and thus if in this position will not impede the operation of wedge 59. A spring 76 on rod 68 is extended between bracket 70 and an abutment 126 fast on rod 68 and urges a second abutment 127 on rod 68 to bear against bracket 70 thus maintaining disc 74 in its inoperative position shown in Fig. 8. When button 71 is pushed, oblong disc 74 will be rotated on an angle of about 90° and will thus spread both heads 60 and 61 apart. The carriage is thus freed to be moved manually to either direction.

The mechanism for varying the path of the carriage displacement will be described now.

As described above, the lift of control member 410 and the displacement of clutch plate 32 associated therewith, and thus the carriage escapement path, depend upon the length of the stroke which bar 2 may execute when it is operated by key 4. As capital letters have a larger width than small letters, an embodiment of the invention will be shown which allows to set the mechanism arbitrarily for two step widths of the carriage escapement movement.

The keys 4 are provided at their lower surfaces with two lugs 3 and 3' of different lengths. Front bar 2 is arranged for being brought into opposition to either of these lugs. For this purpose, front bar 2 is of angular cross-section and is secured at both its ends to square pieces 137, 138, which are rotatably carried by means of pins 135, 136 in tongues 139, 140 of the side bars 141, 142 which together with front bars and rear bars 2 form a rectangular frame-like body.

Pin 135 bears at its other end a pinion 244 which may be engaged by a tooth sector 242 pivotally mounted at 243 to the base frame of the machine. Tooth sector 242 is connected by means of pin and slot to a lever 238 pivoted at 240 to a lever 236 which may be actuated simultaneously with the usual shift key (not shown in the drawings) when capital letters are to be written.

When lever 236 is in the position shown in Fig. 1 for the typing of capital letters, angular bar 2 is, as is shown in full lines in Fig. 7, in opposition to the longer lug 3'. When key 4 is operated, the escapement path will be wide corresponding to the larger width of capital letters, whereas, when lever 236 has been pushed back into the position for typing small letters an angular bar 2 has thus been tilted on an angle of 90° into the position shown in Fig. 7 in dotted lines and into opposition to lug 3, the escapement path of the carriage will be shorter corresponding to the shorter length of lug 3. For limiting the rotation of bar 2 about axis 135, tongue 139 or both tongues 139 and 140, if necessary, may be provided with stops 151 and 152.

The heretofore described arrangement for accommodating the width of the escapement movement to the width of the type may be applied advantageously to a machine carrying several, three for instance, type segments or baskets of different fonts.

The object of such an arrangement is to enable the composition on the same machine of (1) a text of the same group of types but in ordinary, in italics or in heavy type: (2) a text with three different bodies of types or three different kinds of types.

Such an arrangement may be used with a common key-board associated with all three segments, if, as is well known in the art of typewriters, the keys are not positively but operatively connected to their type bar. Displacing of the segment from its operative position into the direction of the key board will then disconnect the type bars from their keys and vice versa shifting the segment carriage to the rear and into operative position will simultaneously connect the individual keys of the key board to their appertaining type bars.

In such a multi-typewriter with a plurality of type-baskets and one single key-board common to all of them, in accordance with this invention, means may be provided at the common key-board which will allow to control the various widths of the escapement movement for the types of different widths, i. e., for the capital or the small letters of each individual type basket.

Fig. 10 shows the embodiment of such a mechanism for controlling the various escapement widths when three type baskets are used for alternative co-operation with a single keyboard common to all of the type baskets. This arrangement will set automatically the correct spacing mechanism, as soon as any type basket has been brought into opposition of the common key board.

In Fig. 10, for the purpose of not crowding the view of this figure with known mechanism, the bare segments 80, 81, and 82 only have been shown which are to carry the type bar sets, and only one type bar 3 out of the set and one key 4 and the appertaining linkage out of the common key board have been illustrated, as both type bars and keys are of any usual type and thus do not need further illustration.

On a common segment carrier frame 77, the three segments or type baskets 80, 81, and 82 are detachably arranged and mounted, by means of plates 83, 84, between guides 89, 90, 91 and 92, which are secured to the segment carrier frame 77. The segments may be adjusted relating their position by means of slots and clamp screws 93.

The carrier frame 77 may be displaced on, or between, guide rails 78 in relation to the stationary key-board and the paper carriage support. The carriage itself is not shown in the drawings and may be of any convenient usual type.

The front face of the carriage frame 77 is provided with a cam 95, 94 extending over the length of the frame and facing the common key-board. The cam has a receding part 95 at its left hand side and a projecting part 94 at its right hand side. On this cam, a cam-roller 96 rides which is mounted within a fork 97 slidably arranged within a head 98 fastened to the stationary frame of the key-board. Fork 97 is connected to a lever 99 of Z-form pivoted at 100 and urged towards head 98 by means of spring 298. Lever 99, at its lower end, is connected to a bar 101 by means of a bar 102 and levers 103, 104. The ends of bar 101 slide in guides 105, 106 which are secured to the stationary frame of the key-board. The keys are provided with a slide 108 each, with all of which slides 108 in common bar 101 is associated and is extended through slots 107 of these slides. These slides carry as many groups of lugs (3, 3') as there are types of different width on each segment, in the example shown, three pairs. Slides 108 may be displaced by means of slots 109 sliding on guide pieces 110 secured to the keys 4 and, when the segment is in its operative position, the lugs associated to a segment will thus be set at their key under the control of cam roller 96 and cam 95, 94.

*Operation*

(1) Positioning of the segment of type bars: When the segment is in its rear position, abutting the rear part of the carrier frame 77, each type bar will register with its appertaining key. To exchange a segment: loosen the screws 93, draw the segment forward, thus disconnecting the type bars 8 from their key levers 203, slide the segment carrier frame 77 to the left or to the right until the other segment is in front of the position which it should occupy, press this segment to the rear until it bears against the rear part of the carrier frame 77 and tighten the screws 93. The type bars 2 will thus come into correct register with their appertaining key levers 203.

(2) Mechanism for putting into register the lugs corresponding to the segment basket which is to be used.

If a segment, for instance as shown in Fig. 10 the central segment, has been brought into operative position, the cam on the front of the segment carriage will have shifted the cam roller 96, tilted lever 99 and brought the central lug groups of all keys into the correct position with relation to bar 2. Correspondingly, when the left hand or the right hand segment is brought into its operative position, cam 95, 94 and cam roller 96 will by means of lever 99 and bars 102, 101 bring the lugs associated with this segment into operative position with regard to bar 2.

The invention has been described and illustrated in a manner exemplificative and not limitative, and it is obvious that a number of modifications can be made in relation to its details in the light of my appended claims without departing from its spirit.

Besides, it is understood that the separate elements can be employed alone or in combination with other apparatus without departing from the scope of the invention, and that certain elements can be applied equally to other machines than those described and in particular to the typewriting machines. Thus, the invention may be applied to the type-setting machine disclosed in my co-pending application No. 112,021 filed November 21, 1936, in which the spacing between subsequent words of a type-script line may be adjusted for the purpose of justifying the line and the escapement movement of this machine may be operated and governed by the gripping and/or clutching mechanism as hereinbefore disclosed.

I claim:

1. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted to engage the rail, means for releasing and engaging the said gripping devices alternately but with engagement of one before release of the other, type-keys each with a type character thereon, and means operated by the type keys for moving the said movable gripping device opposite to the direction of escapement a distance proportional to the width of the character on the key between each release and re-engagement of that gripping device, said means comprising a master control member moving proportionally with the gripping device and adapted to be engaged by all the keys and a movement-defining member on each key, through which the key engages the said master control member, the length of such movement-defining member being proportional to the width of the character on the key.

2. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted to engage the rail, a stop on the frame to limit the movement of the movable gripping device in the direction of escapement, type keys mounted in the frame each with a type character thereon, means operated by the type keys for moving the movable gripping device a distance proportional to the width of the character on the key between each engagement and release of that gripping device, said means comprising a master control member moving proportionally with the gripping device and adapted to be engaged by all the keys and a movement-defining member on each key, through which the key engages the said master control member, the length of such movement-defining member being proportional to the width of the character on the key.

3. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted to engage the rail, means for releasing and engaging the said gripping devices alternately but with engagement of one before release of the other, type keys mounted in the frame each with a type character thereon, and means operated by the type keys for moving the movable gripping device opposite to the direction of escapement a distance proportional to the width of the character of the key, between each release and re-engagement of that gripping device, said means comprising a master control member moving proportionally with the gripping device and adapted to be engaged by all the keys and a movement-defining member on each key, through which the key engages the said master control member, the length of such movement-defining member being proportional to the width of the character on the key, and said means also controlling through the key, the return movement of the movable gripping device during the escapement movement of the carriage.

4. Escapement mechanism for a spring or like operated carriage of a typewriter and the like, comprising a rail fixed to the carriage, a stationary gripping device secured to the frame of the typewriter and adapted to engage the said rail, a movable gripping device slidably mounted on the said frame adjacent to the said rail and adapted to engage the rail, a stop on the frame to limit the movement of the movable gripping device in the direction of escapement, type keys mounted in the frame each with a type character thereon, means operated by the type keys for moving the movable gripping device a distance proportional to the width of the character on the key between each release and re-engagement of that gripping device, said means comprising a master control member moving proportionally with the gripping device and adapted to be engaged by all the keys and a movement-defining member on each key, through which the key engages the said master control member, the length of such movement-defining member being proportional to the width of the character on the key, and said means also controlling through the key, movement of the movable gripping device during the escapement movement of the carriage until it reaches the said stop.

5. Escapement mechanism for a spring or like operated carriage of a typewriter and the like, comprising a rail fixed to the carriage, a stationary gripping device secured to the frame of the typewriter, and adapted to engage said rail, a movable gripping device slidably mounted on the said frame adjacent to the said rail and adapted to engage the rail, means for releasing and engaging the said gripping devices alternately but with engagement of one before release of the other, type keys mounted in the frame having alternative characters on each key, means operated by the type keys for moving the movable gripping device opposite to the direction of escapement, a distance proportional to the width of any of the alternative characters, on the key between each release and re-engagement of that gripping device, said means for moving the gripping device comprising a master movement control member moving proportionally with the gripping device and adapted to be engaged by all the keys, alternative movement-defining members on each key for each alternative character and through which the key engages said master control member, the length of each movement-defining member being proportional to the width of the character on the key, for which it is provided, alternative character selecting means on the typewriter, and selective means on the master control member for engaging the movement-defining member corresponding to the alternative character used.

6. Escapement mechanism for a spring or like operated carriage of a typewriter and the like according to claim 5, characterized in that the said selective means comprises a rod, rotatably mounted on the master control member so as to present alternative faces to the movement-defining members, and rotating means for said rod operated by the alternative character selecting means of the typewriter.

7. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted also to engage the rail, means for releasing and engaging the said gripping devices alternately but with engagement of one before release of the other, a set of type keys mounted in the frame having no type characters, means operated by the type keys for moving the movable gripping device opposite to the direction of escapement between each release and re-engagement of that gripping device, said means for moving the gripping device comprising a master movement control member moving proportionally with the gripping device and adapted to be engaged by all the keys, alternative baskets of type bars each having a type character and any one of which baskets is adapted to be brought with its type bars into operative relation with the corresponding type keys, alternative movement-defining members on each type key through which the key engages the said master control member, the length of each movement-defining member being proportional to the width of each character of the type bars of the alternative baskets which such key operates and selective means controlled by each basket for selecting the correct movement-defining member to engage the master control member.

8. Escapement mechanism for a spring or like operated carriage of a typewriter and the like according to claim 7, characterized by alternative characters on each type bar and alternative movement-defining members on each key for each alternative character, alternative character selecting means on the typewriter and selective means on the master control member operated by the character selecting means of the typewriter and additional to the selective means controlled by the basket for selecting such alternative movement defining members.

9. Escapement mechanism for a spring or like operated carriage of a typewriter or the like, comprising a rail fixed to the carriage, a stationary gripping device secured to the frame of the typewriter and adapted to engage said rail, a movable gripping device slidably mounted on said frame adjacent to the said rail and adapted to engage also with the rail, means for releasing and engaging the said gripping devices alternately, but with engagement of one before release of the other, type keys mounted in the frame having no type characters, means including a master control member moving proportionally with the gripping device and engaged operably by the type keys for moving the movable gripping device opposite to the direction of escapement between each release and re-engagement of that gripping device, alternative baskets of type bars each having a type character and any one of which baskets is adapted to be brought into operative relation with the one set of keys, a sliding member on each key carrying alternative movement defining members, one for each type bar operated by the key and selectively through which member the key engages the master control member, the length of each of said movement-defining members being proportional to the width of each character which is controlled by the key, selective means operated by the change of type basket for sliding the movement-defining member on the key for the character of the type bar of the basket in situ.

10. Escapement mechanism for a spring or like operated carriage of a typewriter and the like according to claim 9 characterised by alternative characters on each type bar and alternative movement-defining members on the sliding member of each key for each alternative character, alternative character selecting means on the typewriter and selective means on the master control member operated by the character selecting means of the typewriter and additional to the selective means controlled by the basket for selecting such alternative movement-defining members.

11. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted also to engage the rail, means for releasing and engaging the said gripping devices alternately but with engagement of one before release of the other, means operated by the type keys for moving the movable gripping device opposite to the direction of escapement a distance proportional to the width of the character on the key between each release and re-engagement of that device, said means comprising a master control member moving proportionally with the gripping device and adapted to be engaged by all the keys and a movement-defining member on each key, through which the key engages the said master control member, the length of such movement-defining member being proportional to the width of the character on the key, the movable gripping device being uni-directional and the stationary gripping device being bi-directional.

12. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted also to engage the rail, means for releasing and engaging the gripping devices alternately but with engagement of one before release of the other, a set of type keys mounted in the frame having no type characters, means including a master control member, moving proportionally with the gripping device and engaged operably by the type keys for moving the gripping device opposite to the direction of escapement between each release and re-engagement of that gripping device, alternative baskets of type bars each having alternative type characters, any one of which baskets is adapted to be brought with its type bars into operative relation with the one set of keys, a sliding member on each key carrying alternative movement-defining members, one for each type character for that key selectively, through which the key engages the master control member, the length of each said movement-defining member being proportional to the width of each character of the type bars which is controlled by the key, alternative character selecting means on the typewriter, selective means operated by the change of type basket for sliding the movement-defining member on the key, selective means on the master control member operated by the alternative character selecting means on the typewriter, for selecting the alternative movement-defining member for the alternative character of the type bars of the basket in situ, the movable gripping device being uni-directional and the stationary brake mechanism gripping device being bi-directional.

13. Escapement mechanism for a spring or like operated carriage of a typewriter or the like, comprising a rail fixed to the carriage, a stationary gripping device secured to the frame of the typewriter and adapted to engage said rail, a movable gripping device slidably mounted on the said frame, adjacent to the said rail and also adapted to engage the rail, means for releasing and engaging the gripping devices alternately, but with engagement of one before release of the other, type keys each with a type character thereon, and means operated by the type keys for moving the said movable gripping device opposite to the direction of escapement a distance proportional to the width of the character on the key between each release and re-engagement of that gripping device, said means comprising a master control member moving proportionally with the gripping device and adapted to be engaged by all the keys and a movement-defining member on each key, through which the key engages the said master control member, the length of such movement-defining member being proportional to the width of the character on the key, said means for releasing and engaging the gripping devices comprising rods and sliding cams on which the rods rest, and means operated by the key for imparting a compound sliding movement to the cams so that the ends of the rods trace out a closed path thereon.

14. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on said frame adjacent to the said rail and adapted to engage also with the rail, means for releasing and engaging the said gripping devices alternately, but with engagement of one before release of the other, type keys mounted in the frame having no type characters, means including a master control member, moving proportionally with the gripping device and engaged operably by the type keys for moving the movable gripping device opposite to the direction of escapement between each release and re-engagement of that gripping device alternative baskets of type bars each having a type character and any one of which baskets is adapted to be brought into operative relation with the one set of keys, a sliding member on each key carrying alternative movement defining members, one for each type bar operated by the key and selectively through which member the key engages the master control member, the length of each of said movement-defining members being proportional to the width of each character, which is controlled by the key, selective means operated by the change of type basket for sliding the movement-defining member on the key for the character of the type bar of the basket in situ, the said means for releasing and engaging the gripping devices comprising rods and sliding cams on which the rods rest and means for imparting a sliding movement to the cams in two successive directions so that the ends of the rods trace out a closed path thereon.

15. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame, adjacent to the said rail and also adapted to engage the rail, means for releasing and engaging the gripping devices alternately, but with engagement of one before release of the other, type keys each with a type character thereon and means operated by the type keys for moving the said movable gripping device opposite to the direction of escapement a distance proportional to the width of the character on the key between each release and re-engagement of that gripping device, said means comprising a master control member moving proportionally with the gripping device and adapted to be engaged by all the keys and a movement defining member on each key, through which the key engages the said master control member, the length of such movement-defining member being proportional to the width of the character on the key, said means for releasing and engaging gripping devices comprising rods and sliding cams on which the rods rest, and means operated by the key for imparting a compound sliding movement to the cams so that the ends of the rods trace out a closed path thereon, the means for sliding the cam actuating the stationary gripping device secured to the frame including mechanism operated direct by the key having a constant movement and other mechanism operated by the key for movement proportional to the character on the key.

16. Escapement mechanism for a spring or like operated carriage of a typewriter and the like, comprising a rail fixed to the carriage, a stationary gripping device secured to the frame of the typewriter and adapted to engage said rail, a movable gripping device slidably mounted on the said frame adjacent to the said rail and adapted also to engage the rail, means for releasing and engaging the gripping devices alternately but with engagement of one before release of the other, a set of type keys mounted in the frame having no type characters, means including a master control member, moving proportionally with the gripping device and engaged operably by the type keys for moving the further gripping device opposite to the direction of escapement between each release and re-engagement of that gripping device, alternative baskets of type bars each having alternative type characters, any one of which baskets is adapted to be brought with its type bars into operative relation with the one set of keys, a sliding member on each key carrying alternative movement-defining members, one for each type character for that key selectively, through which the key engages the master control member, the length of each said movement-defining member being proportional to the width of each character of the type bars which is controlled by the key, alternative character selecting means on the typewriter, selective means operated by the change of type basket for sliding the movement-defining member on the key, selective means on the master control member operated by the alternative character selecting means on the typewriter, for selecting the alternative movement-defining member for the alternative character of the type bars of the basket in situ, the movable gripping device being uni-directional and the stationary gripping device being bi-directional, the means for releasing and engaging the gripping devices comprising rods and sliding cams on which the rods rest and means operated by the key for imparting a compound sliding movement to the cams so that the ends of the rods trace out a closed path thereon, the means for sliding the cam actuating the stationary gripping device secured to the frame including mechanism operated direct by the key having a constant movement and other mechanism operated by the key for movement proportional to the character on the key, and derived from the movement of the movable gripping device.

RENÉ LOUIS ROMAIN
ROBERT GEIRNAERT.